(12) United States Patent
Shimada et al.

(10) Patent No.: US 8,497,645 B2
(45) Date of Patent: Jul. 30, 2013

(54) CONTROL DEVICE FOR ELECTRIC MOTOR DRIVE DEVICE

(75) Inventors: Arinori Shimada, Anjo (JP); Subrata Saha, Anjo (JP); Ken Iwatsuki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 473 days.

(21) Appl. No.: 12/909,889

(22) Filed: Oct. 22, 2010

(65) Prior Publication Data
US 2011/0127933 A1 Jun. 2, 2011

(30) Foreign Application Priority Data
Nov. 30, 2009 (JP) ................................. 2009-272840

(51) Int. Cl.
*H02P 21/00* (2006.01)

(52) U.S. Cl.
USPC ............ 318/400.02; 318/400.07; 318/400.23; 318/432; 318/434

(58) Field of Classification Search
USPC .................. 318/400.02, 400.07, 400.23, 432, 318/434
See application file for complete search history.

(56) References Cited

U.S. PATENT DOCUMENTS

| 6,646,394 B2 * | 11/2003 | Arimitsu et al. ............... 318/151 |
| 7,928,686 B2 * | 4/2011 | Saha et al. ..................... 318/807 |
| 2001/0019249 A1 | 9/2001 | Kato et al. |
| 2008/0265831 A1 | 10/2008 | Imai et al. |
| 2008/0303470 A1 | 12/2008 | Schulz et al. |
| 2013/0049655 A1 * | 2/2013 | Takai et al. ............... 318/400.02 |
| 2013/0057188 A1 * | 3/2013 | Takamatsu et al. ........... 318/459 |

FOREIGN PATENT DOCUMENTS

| JP | A-2001-231288 | 8/2001 |
| JP | A-2002-272184 | 9/2002 |
| JP | B2-3890907 | 3/2007 |
| JP | A-2008-271740 | 11/2008 |

OTHER PUBLICATIONS

Jan. 18, 2011 International Search Report issued in PCT/JP2010/068853 (with translation).

* cited by examiner

*Primary Examiner* — Erick Glass
(74) *Attorney, Agent, or Firm* — Oliff & Berridge, PLC

(57) ABSTRACT

A control device that controls an electric motor drive device is configured with a current control portion that determines a voltage command value, a voltage control portion that generates a switching control signal, and a current control period determining portion. The control device is also configured with a voltage control period determining portion that determines a voltage control period, and a control period setting portion. In the control device, the current control period determining portion determines, according to a target torque, the current control period as a value that increases continuously or stepwise as the target torque decreases. Furthermore, the voltage control period determining portion determines, according to a rotating speed, the voltage control period as a value that increases continuously or stepwise as the rotating speed decreases.

7 Claims, 3 Drawing Sheets

CONTROL DEVICE FOR ELECTRIC MOTOR DRIVE DEVICE

INCORPORATION BY REFERENCE

The disclosure of Japanese Patent Application No. 2009-272840 filed on Nov. 30, 2009 including the specification, drawings and abstract is incorporated herein by reference in its entirety.

BACKGROUND OF THE INVENTION

The present invention relates to control devices for controlling an electric motor drive device having an inverter that converts a direct current (DC) voltage to an alternating current (AC) voltage to supply the AC voltage to an AC electric motor.

DESCRIPTION OF THE RELATED ART

A control device is known that controls an electric motor drive device having an inverter that converts a DC voltage from a DC power source to an AC voltage to supply the AC voltage to an AC electric motor, and performs current feedback control of the AC electric motor. Such a control device for an electric motor drive device repeatedly performs both a current control process and a voltage control process in every predetermined period. The current control process is a process of determining a voltage command value based on the deviation between a current command value, which is a command value of a current to be applied to a coil of the AC electric motor, and a current detection value, which is a detection value of a current that flows in the coil. The voltage control process is a process of generating a switching control signal of the inverter corresponding to the voltage command value. Regarding the period for performing the current control process and the voltage control process, Publication of Japanese Patent No. 3,890,907 below, for example, discloses a structure in which a current control period, which is a period for performing the current control process, is 200 μs or 400 μs.

SUMMARY OF THE INVENTION

Although not specifically described in Publication of Japanese Patent No. 3,890,907, the current control period and a voltage control period (a period for performing the voltage control process) are typically set to values, as fixed values, which achieve desired control performance (such as control response characteristics, the level of current ripples, and the like) at all the possible operating points (such as the torque, the rotating speed, and the like) of an AC electric motor. That is, the current control period and the voltage control period are set according to the operating point at which the current control period and the voltage control period become the shortest (hereinafter referred to as the "limit operating point"). This enables the AC electric motor to be appropriately controlled regardless of its operating point, even if the current control period and the voltage control period are set to fixed values.

However, in the structure in which the current control period and the voltage control period are set to fixed value as described above, the current control process and the voltage control process may possibly be performed with an unnecessarily short period if the AC electric motor is operating at an operating point that is significantly different from the limit operating point. This problem may become significant if the control device is a device for controlling an AC electric motor that is mounted as a driving force source on electric vehicles, hybrid vehicles, or the like. This is because a possible range of the operating point of the AC electric motor that is mounted on such vehicles (hereinafter referred to as the "operating point range") may be larger than that of an AC electric motor that is operated at its rating substantially constantly. Thus, the conventional structure in which the current control period and the voltage control period are set to fixed values is not preferable for AC electric motors that may have a larger operating point range, such as AC electric motors that are mounted as a driving force source on electric vehicles, hybrid vehicles, or the like.

Accordingly, it is desired to implement control devices for electric motor drive devices, which are preferable to control AC electric motors that may have a larger operating point range.

According to a first aspect of the present invention, a control device for controlling an electric motor drive device including an inverter that converts a DC voltage to an AC voltage to supply the AC voltage to an AC electric motor includes: a current control portion for performing a current control process of determining a voltage command value based on a deviation between a current command value, which is a command value of a current to be applied to a coil of the AC electric motor, and a current detection value, which is a detection value of a current that flows in the coil; a voltage control portion for performing a voltage control process of generating a switching control signal of the inverter corresponding to the voltage command value; a current control period determining portion for determining a current control period, which is a period of performing the current control process, based on target torque of the AC electric motor; a voltage control period determining portion for determining a voltage control period, which is a period of performing the voltage control process, based on a rotating speed of the AC electric motor; and a control period setting portion for setting the current control period and the voltage control period based on the determination of the current control period determining portion and the voltage control period determining portion. In the control device, the current control period determining portion determines, according to the target torque, the current control period as a value that increases continuously or stepwise as the target torque decreases, and the voltage control period determining portion determines, according to the rotating speed, the voltage control period as a value that increases continuously or stepwise as the rotating speed decreases.

According to the first aspect above, the current control period is set to a larger value as the target torque of the AC electric motor decreases. This enables the current control period to be set appropriately according to response characteristics of the AC electric motor which degrade as the target torque decreases. This can reduce the possibility that the voltage command value may be updated (the current control process may be performed) with such a short period that the AC electric motor cannot follow appropriately.

Further, according to the first aspect, the voltage control period is set to a larger value as the rotating speed of the AC electric motor decreases. This enables the voltage control period to be set appropriately according to a change with time of a magnetic pole position that indicates a rotation angle of a rotor of the AC electric motor, which occurs at a lower rate as the rotating speed decreases. This can reduce the possibility that the switching control signal may be generated (the voltage control process may be performed) with an unnecessarily short period in order to reduce the magnitude of current ripples to a practically acceptable level.

Thus, according to the first aspect above, the current control period and the voltage control period can be set according to the operating point of the AC electric motor, while reducing the possibility that the current control process and the voltage control process may be performed with an unnecessarily short period. This can reduce the possibility that an operation load on an arithmetic processing unit included in the control device may increase unnecessarily. The operation load relating to a current feedback control of the arithmetic processing unit of the control device is reduced as the current control period and the voltage control period increase. This enables the arithmetic processing unit to easily perform other process in parallel, or the like. Thus, the control device for the electric motor drive device according to the present invention is preferable to control an AC electric motor that may have a larger operating point range.

Note that in the case where the switching control signal of the inverter is a pulse width modulation (PWM) signal that is generated based on a carrier (a carrier wave), switching losses can be reduced by reducing a carrier frequency according to an increase in the voltage control period.

The current control period that is determined by the current control period determining portion may be a value that is set based on an electrical time constant of the AC electric motor that is determined according to the target torque, and the voltage control period that is determined by the voltage control period determining portion may be a value that is set based on a time corresponding to one cycle of an electrical angle that is determined according to the rotating speed.

A minimum update period of the voltage command value that the AC electric motor can appropriately follow increases as the target torque (the current command value) decreases, and this minimum update period can be appropriately derived based on the electrical time constant. With the above structure, such a minimum update period that is derived based on the electrical time constant described above, or a period that is not significantly longer than the minimum update period can be set as the current control period that is determined by the current control period determining portion. This structure enables an appropriate period that is not unnecessarily short to be set as the current control period according to the target torque, while reducing the possibility that control response characteristics may degrade due to the control device.

A maximum update period of the switching control signal in which the magnitude of current ripples is suppressed to a practically acceptable level increases as the rotating speed decreases, and this maximum update period can be appropriately derived based on a time corresponding to one cycle of the electrical angle. With the above structure, such a maximum update period that is derived based on the time corresponding to one cycle of the electrical angle, or a period that is not significantly shorter than this update period can be set as the voltage control period that is determined by the voltage control period determining portion. This structure enables an appropriate period that is not unnecessarily short to be set as the voltage control period according to the rotating speed, while reducing the possibility that current ripples may increase.

If the current control period determined by the current control period determining portion is shorter than the voltage control period determined by the voltage control period determining portion, the control period setting portion may set the voltage control period to a same value as the current control period determined by the current control period determining portion.

In the voltage control process, the switching control signal of the inverter is typically generated based on the voltage command value determined in the most resent current control process. Thus, if the current control period is shorter than the voltage control period, part of the update result of the voltage command value by the current control process may not be reflected on the voltage control process, and the voltage command value may be updated unnecessarily frequently. The above structure is capable of effectively use all the results of the current control processes. Note that setting the voltage control period to a shorter value according to the current control period hardly causes problems.

The control device may further include a control period storing portion that stores a current control period map, which defines the current control period for each of a plurality of target torque regions that are set by dividing a possible range of the target torque into a plurality of regions, and a voltage control period map, which defines the voltage control period for each of a plurality of rotating speed regions that are set by dividing a possible range of the rotating speed into a plurality of regions. In the control device, the current control period map may define the current control period that increases stepwise as the target torque region decreases, and the voltage control period map may define the voltage control period that increases stepwise as the rotating speed region decreases. Further, the current control period determining portion may determine the current control period by referring to the current control period map stored in the control period storing portion, and the voltage control period determining portion may determine the voltage control period by referring to the voltage control period map stored in the control period storing portion.

With this structure, the current control period determining portion and the voltage control period determining portion can appropriately determine the current control period and the voltage control period by merely referring to the current control period map and the voltage control period map stored in the control period storing portion. This can simplify the structure of the current control period determining portion and the voltage control period determining portion, and can reduce the possibility that the operation load on the arithmetic processing unit of the control device may increase significantly upon determination of the current control period and the voltage control period.

The current control process may be a current feedback control process of determining the voltage command value by performing at least proportional control and integral control based on the deviation between the current command value and the current detection value, and both a proportional control gain, which is a control gain of the proportional control, and an integral control gain, which is a control gain of the integral control, may be changed according to the current control period.

With this structure, the proportional control gain and the integral control gain can be appropriately set while reducing the possibility of an overshoot phenomenon and a decrease in capability of the current detection value to follow the current command value, when the current control period is changed.

DETAILED DESCRIPTION OF THE EMBODIMENTS

Figure 1:
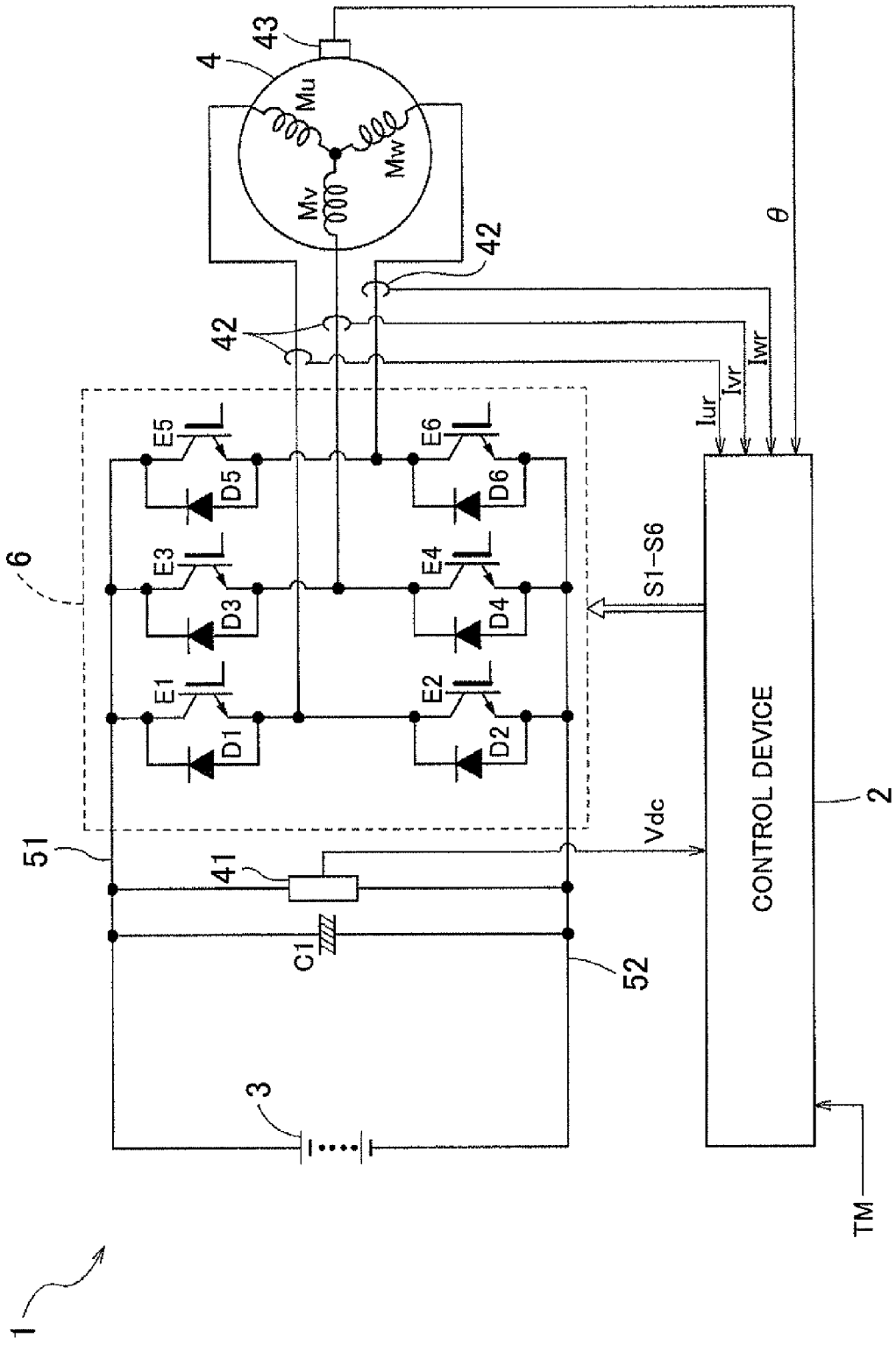
FIG. 1 is a circuit diagram showing the structure of an electric motor drive device according to an embodiment of the present invention.
Figure 2:
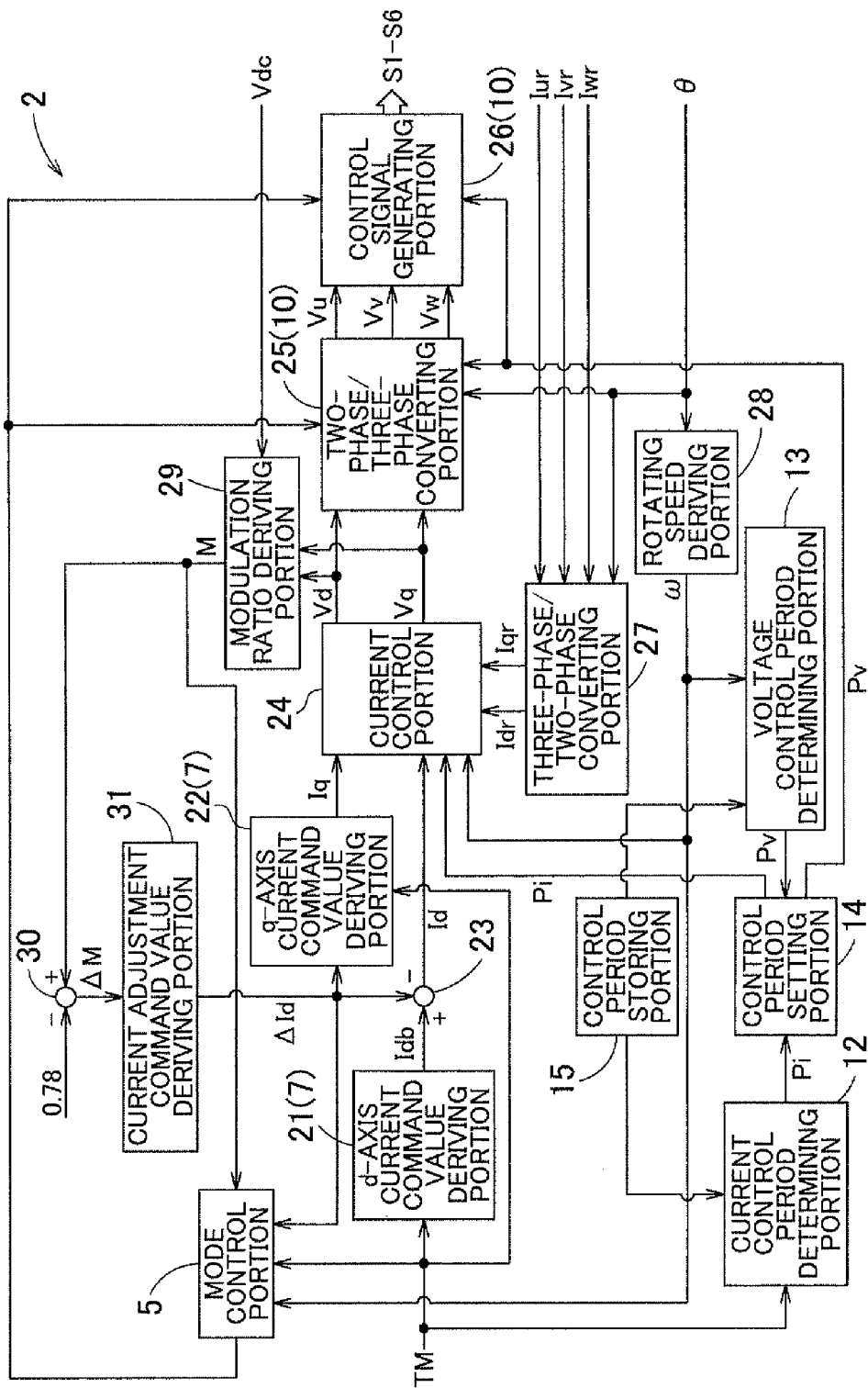
FIG. 2 is a functional block diagram of a control device according to the embodiment of the present invention.
Figure 3:
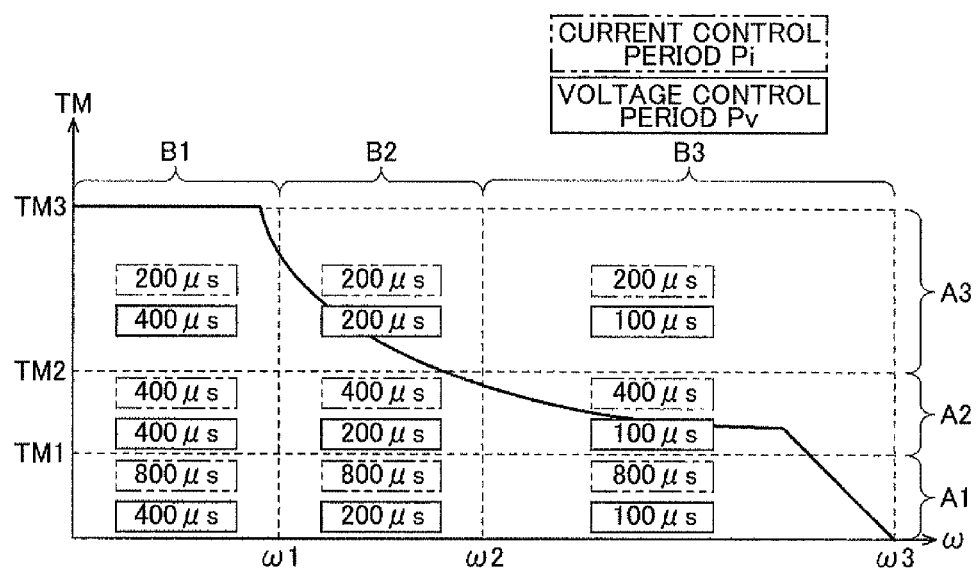
FIG. 3 is a graph conceptually showing a current control period map and a voltage control period map according to the embodiment of the present invention.

An embodiment of a control device for an electric motor drive device according to the present invention will be described below with reference to the accompanying drawings. As shown in FIG. 1, the present embodiment will be described with respect to an example in which an electric motor drive device 1 is structured as a device for driving an interior permanent magnet synchronous electric motor 4 (IPMSM; hereinafter simply referred to as the "electric motor 4") as an AC electric motor that is operated by a three-phase alternating current. In the present embodiment, a control device 2 controls the electric motor control device 1 to perform current feedback control of the electric motor 4 by using a vector control method. More specifically, as shown in FIG. 2, the control device 2 includes a current control portion 24 for performing a current control process in every current control period Pi, and a voltage control portion 10 for performing a voltage control process in every voltage control period Pv. As shown in FIG. 3, the control device 2 is characterized by setting the current control period Pi and the voltage control period Pv according to an operating point of the electric motor 4 which is determined by a rotating speed U) and target torque TM, and is also characterized by the relation between the current control period Pi and the voltage control period Pv that are set and the operating point of the electric motor 4. The electric motor drive device 1 and the control device 2 according to the present embodiment will be described in detail below.

1. Structure of Electric Motor Drive Device

First, the structure of the electric motor drive device 1 according to the present embodiment will be described with reference to FIG. 1. The electric motor drive device 1 includes an inverter 6 for converting a DC voltage Vdc to an AC voltage to supply the AC voltage to the electric motor 4. Note that the electric motor 4 is structured to operate also as an electric generator as required. The electric motor 4 is used as, e.g., a driving force source of electric vehicles, hybrid vehicles, and the like. The electric motor drive device 1 includes a DC power source 3 for generating the DC voltage Vdc, and a smoothing capacitor C1 for smoothing the DC voltage Vdc from the DC power source 3. For example, various secondary batteries such as a nickel-hydrogen secondary battery and a lithium ion secondary battery, capacitors, combinations thereof, or the like can be used as the DC power source 3. The DC voltage Vdc, which is the voltage of the DC power source 3, is detected by a voltage sensor 41, and is output to the control device 2. Note that the electric motor drive device 1 may include a converter for stepping up or stepping down the voltage of the DC power source 3, and an output of the converter may be supplied as the DC voltage Vdc to the inverter 6.

The inverter 6 is a device for converting the DC voltage Vdc to an AC voltage to supply the AC voltage to the electric motor 4. The inverter 6 includes a plurality of sets of switching elements E1 to E6 and diodes D1 to D6. The inverter 6 includes a pair of switching element for each of three phases (U-phase, V-phase, and W-phase) of the electric motor 4. More specifically, the inverter 6 includes a U-phase upper arm element E1 and a U-phase lower arm element E2, a V-phase upper arm element E3 and a V-phase lower arm element E4, and a W-phase upper arm element E5 and a W-phase lower arm element E6. In this example, insulated gate bipolar transistors (IGBTs) are used as the switching elements E1 to E6. The emitter of the upper arm element E1, E3, E5 of each phase, and the collector of the lower arm element E2, E4, E6 of each phase are connected to a coil of a corresponding phase (a U-phase coil Mu, a V-phase coil Mv, or a W-phase coil Mw) of the electric motor 4. In the following description, these three-phase coils are sometimes collectively referred to as the "coils Mu, Mv, Mw" unless the coils need be specified. The collector of the upper arm element E1, E3, E5 of each phase is connected to a system voltage line 51, and the emitter of the lower arm element E2, E4, E6 of each phase is connected to a negative line 52. Diodes D1 to D6, each functioning as a freewheel diode, are connected in parallel with the switching elements E1 to E6, respectively. Note that in addition to the IGBTs, power transistors of various structures, such as bipolar transistors, field effect transistors, and metal oxide semiconductor (MOS) transistors, can be used as the switching elements E1 to E6.

The switching elements E1 to E6 are respectively turned on/off according to switching control signals S1 to S6 that are output from the control device 2. Thus, the inverter 6 converts the DC voltage Vdc to an AC voltage to supply the AC voltage to the electric motor 4, thereby causing the electric motor 4 to output torque according to the target torque TM. At this time, the switching elements E1 to E6 are switched on/off by pulse width modulation (PWM) control or rectangular wave control, which is described later, according to the switching control signals S1 to S6. In the present embodiment, the switching control signals S1 to S6 are gate drive signals for driving the gates of the switching elements E1 to E6. When the electric motor 4 functions as an electric generator, the inverter 6 converts a generated AC voltage to a DC voltage to supply the DC voltage to the system voltage line 51. A current of each phase that flows in the coil Mu, Mw, Mw of each phase of the electric motor 4, more specifically, each of a U-phase current Iur, a V-phase current Ivr, and a W-phase current Iwr, is detected by a current sensor 42, and is output to the control device 2.

A magnetic pole position θ of a rotor of the electric motor 4 at each time is detected by a rotation sensor 43, and is output to the control device 2. The rotation sensor 43 is formed by, e.g., a resolver. The magnetic pole position θ represents a rotation angle of the rotor in an electrical angle. The target torque TM of the electric motor 4 is input to the control device 2 as a request signal from, e.g., other control device such as a vehicle control device, not shown.

2. Structure of Control Device

Functions of the control device 2 shown in FIG. 1 will be described in detail below with reference to FIG. 2. Note that the function relating to setting of control periods, which is a main part of the present invention, will be described later in Section 3. Each functional portion of the control device 2 described below is formed by one or both of hardware and software (a program) for performing various processing of input data, by using a logic circuit such as a microcomputer as a core member. As described above, the target torque TM and the magnetic pole position θ are input to the control device 2. The U-phase current Iur, the V-phase current Ivr, and the W-phase current Iwr are also input to the control device 2. The control device 2 performs current feedback control using a vector control method, based on the target torque TM, the magnetic pole position θ, the rotating speed ω of the electric motor 4 which is derived from the magnetic pole position θ, and the currents Iur, Ivr, Iwr of each phase, and determines a d-axis voltage command value Vd and a q-axis voltage command value Vq, namely command values of voltages to be supplied to the electric motor 4. In the vector control method, the d-axis represents a magnetic flux direction of a field magnet, and the q-axis represents a direction that is advanced by π/2 in an electrical angle with respect to the direction of the field magnet. The control device 2 generates and outputs the switching control signals S1 to S6 for driving the inverter 6 based on the d-axis voltage command value Vd and the q-axis voltage command value Vq, and performs drive control of the electric motor 4 via the inverter 6. In the present embodiment, the d-axis voltage command value Vd and the q-axis voltage command value Vq correspond to a "voltage command value" in the present invention. In the following description, these two-axis voltage command values are sometimes collectively referred to as the "voltage command values Vd, Vq" unless these voltage command values need be specified.

As shown in FIG. 2, a current command determining portion 7 for determining a d-axis current command value Id and a q-axis current command value Iq as command values of a current to be applied to the coil Mu, Mv, Mw of the electric motor 4 includes a d-axis current command value deriving portion 21 and a q-axis current command value deriving portion 22. In the present embodiment, the d-axis current command value Id and the q-axis current command value Iq correspond to a "current command value" in the present invention. In the following description, these two-axis current command values are sometimes collectively referred to as the "current command values Id, Iq" unless these current command values need be specified.

The target torque TM is input to the d-axis current command value deriving portion 21. The d-axis current command value deriving portion 21 derives a basic d-axis current command value Idb based on the input target torque TM. The basic d-axis current command value Idb corresponds to a command value of a d-axis current in the case of performing maximum torque control. The maximum torque control refers to control for adjusting a current phase so that the output torque of the electric motor 4 becomes the largest for the same current. In the maximum torque control, torque can be generated most efficiently for the currents that are applied to the coils Mu, Mv, Mw of the electric motor 4. Note that the current phase refers to a phase of a resultant vector of the d-axis current command value Id and the q-axis current command value Iq with respect to the q-axis.

The d-axis current command value deriving portion 21 refers to, e.g., a map to derive the basic d-axis current command value Idb according to the value of the target torque TM. The basic d-axis current command value Idb thus derived is input to a subtracter 23. A d-axis current adjustment command value ΔId, which is derived by a current adjustment command value deriving portion 31 described below, is also input to the subtracter 23. As shown by the expression (1) below, the subtracter 23 subtracts the d-axis current adjustment command value ΔId from the basic d-axis current command value Idb to derive an adjusted d-axis current command value Id.

$$Id = Idb - \Delta Id \tag{1}$$

The target torque TM and the d-axis current adjustment current value ΔId are input to the q-axis current command value deriving portion 22. The q-axis current command value deriving portion 22 derives a q-axis current command value Iq based on the input target torque TM and the input d-axis current adjustment command value ΔId. The q-axis current command value deriving portion 22 refers to, e.g., a map so as to derive the q-axis current command value Iq according to the target torque TM and the d-axis current adjustment current value ΔId.

The d-axis current command value Id and the q-axis current command value Iq derived as described above are input to the current control portion 24. An actual d-axis current Idr and an actual q-axis current Iqr are also input from a three-phase/two-phase converting portion 27 to the current control portion 24, and the rotating speed ω of the electric motor 4 is input from a rotating speed deriving portion 28 to the current control portion 24. The actual d-axis current Idr and the actual q-axis current Iqr are derived by performing three-phase/two-phase conversion by the three-phase/two-phase converting portion 27 based on the U-phase current Iur, the V-phase current Ivr, and the W-phase current Iwr detected by the current sensor 42 (see FIG. 1), and the magnetic pole position θ detected by the rotation sensor 43 (see FIG. 1). In the present embodiment, the actual d-axis current Idr and the actual q-axis current Iqr correspond to a "current detection value" in the present invention. In the following description, the actual d-axis current Idr and the actual q-axis current Iqr are sometimes collectively referred to as the "current detection values Idr, Iqr" unless these two-axis currents Idr, Iqr need be specified. The rotating speed ω of the electric motor 4 is derived by the rotating speed deriving portion 28 based on the magnetic pole position θ detected by the rotation sensor 43 (see FIG. 1).

The current control period Pi is also input from a control period setting portion 14 described below to the current control portion 24. The current control portion 24 performs a current control process in every current control period Pi. The current control process is a process of determining the voltage command values Vd, Vq based on the deviation between the current command values Id, Iq, which are command values of the currents to be applied to the coils Mu, Mv, Mw of the electric motor 4, and the current detection values Idr, Iqr, which are detection values of the currents that flow in the coils Mu, Mv, Mw.

More specifically, the current control portion 24 derives a basic d-axis voltage command value Vdb by performing a proportional integral control operation (a PI control operation) based on the deviation between the d-axis current command value Id and the actual d-axis current Idr, as shown by the expression (2) below. The current control portion 24 also derives a basic q-axis voltage command value Vqb by performing the proportional integral control operation based on the deviation between the q-axis current command value Iq and the actual q-axis current Iqr, as shown by the expression (3) below.

$$Vdb = (Kpd + Kid/s) \times (Id - Idr) \tag{2}$$

$$Vqb = (Kpq + Kiq/s) \times (Iq - Iqr) \tag{3}$$

Kpd and Kpq represent d-axis and q-axis proportional control gains, respectively, Kid and Kiq represent d-axis and q-axis integral control gains, respectively, and s represents a Laplacian operator. Note that it is also preferable to perform a proportional integral derivative control operation (a PID control operation) instead of the proportional integral control operation.

The current control portion 24 derives the d-axis voltage command value Vd by adding a d-axis voltage adjustment value ΔVd to the basic d-axis voltage command value Vdb, as shown by the expression (4) below. The current control portion 24 also derives the q-axis voltage command value Vq by adding a q-axis voltage adjustment value ΔVq to the basic q-axis voltage command value Vqb, as shown by the expression (5) below.

$$Vd = Vdb + \Delta Vd \quad (4)$$

$$Vq = Vqb + \Delta Vq \quad (5)$$

In the present embodiment, the d-axis voltage adjustment value ΔVd and the q-axis voltage adjustment value ΔVq are given by the following expressions (6), (7).

$$\Delta Vd = -Eq \quad (6)$$

$$\Delta Vq = Ed + Em \quad (7)$$

Ed represents a d-axis armature reaction, and is given by the product of the rotating speed ω, d-axis inductance Ld, and the actual d-axis current Idr. Eq represents a q-axis armature reaction, and is given by the product of the rotating speed w, q-axis inductance Lq, and the actual q-axis current Iqr. Em represents an induced voltage generated by an armature flux linkage of a permanent magnet (not shown), and is given by the product of an induced voltage constant MIf, which is determined by an effective value of the armature flux linkage of the permanent magnet, and the rotating speed ω. Note that in this example, the permanent magnet is positioned in the rotor.

The d-axis voltage command value Vd and the q-axis voltage command value Vq derived by the current control portion 24 are input to a modulation ratio deriving portion 29. The DC voltage Vdc detected by the voltage sensor 41 is also input to the modulation ratio deriving portion 29. The modulation ratio deriving portion 29 derives a modulation ratio M based on these input values according to the expression (8) below.

$$M = \sqrt{(Vd^2 + Vq^2)}/Vdc \quad (8)$$

In the present embodiment, the modulation ratio M is a ratio of an effective value of a fundamental wave component of an output voltage waveform of the inverter 6 to the DC voltage Vdc, and is herein derived as an effective value of a three-phase line voltage divided by the DC voltage Vdc. In the present embodiment, the modulation ratio M corresponds to a voltage index that represents the magnitude of the voltage command value Vd, Vq with respect to the DC voltage Vdc at the time.

As the rotating speed ω of the electric motor 4 increases, the induced voltage increases, and an AC voltage required to drive the electric motor 4 (hereinafter referred to as the "required voltage") also increases. When this required voltage exceeds the maximum possible AC voltage that can be output from the inverter 6 as a result of conversion of the DC voltage Vdc at the time (hereinafter referred to as the "maximum output voltage"), currents required for the coils can no longer be applied, and the electric motor 4 cannot be appropriately controlled. Thus, the control device 2 is structured to perform field weakening control described below, in a region where the modulation ratio M, which represents the required voltage of the electric motor 4 for the maximum output voltage based on the DC voltage Vdc, is larger than a theoretical maximum value "0.78." That is, the d-axis current adjustment command value ΔId is derived based on the modulation ratio M derived by the modulation ratio deriving portion 29, and the basic d-axis current command value Idb is adjusted based on the derived d-axis current adjustment command value ΔId. Note that the required voltage and the maximum output voltage can be compared with each other as an effective value of the AC voltage.

More specifically, the modulation ratio M derived by the modulation ratio deriving portion 29, and the theoretical maximum value "0.78" of the modulation ratio M are input to a subtracter 30. The subtracter 30 subtracts "0.78" from the modulation ratio M to derive a modulation ratio deviation ΔM, as shown by the expression (9) below.

$$\Delta M = M - 0.78 \quad (9)$$

Note that although the modulation ratio deviation ΔM is derived by subtracting "0.78" from the modulation ratio M in this example, it is also possible to subtract a value less than "0.78" from the modulation ratio M.

The modulation ratio deviation ΔM derived by the subtracter 30 is input to the current adjustment command value deriving portion 31. The current adjustment command value deriving portion 31 integrates the modulation ratio deviation ΔM by using a predetermined gain to calculate an integrated value ΣΔM. If the integrated value ΣΔM is positive, the current adjustment command value deriving portion 31 multiplies the integrated value ΣΔM by a proportionality constant to derive the d-axis current adjustment command value ΔId (>0). If the integrated value ΣΔM is zero or less, the current adjustment command value deriving portion 31 sets the d-axis current adjustment command value ΔId to zero. The d-axis current adjustment command value ΔId thus derived is subtracted from the basic d-axis current command value Idb as shown by the above expression (1) to derive the d-axis current command value Id. That is, normal field control is performed if the d-axis current adjustment command value ΔId is zero (ΔId=0), and field weakening control is performed if the d-axis current adjustment command value ΔId is positive (ΔId>0).

As used herein, the normal field control refers to field control in which the basic d-axis current command value Idb derived by the d-axis current command value deriving portion 21 is not adjusted. That is, in the present embodiment, the maximum torque control is performed during the normal field control. The field weakening control refers to field control in which the basic d-axis current command value Idb is adjusted so as to weaken a field flux of the electric motor 4 as compared to the normal field control. That is, in the field weakening control, the basic d-axis current command value Idb is adjusted to advance a current phase as compared to the normal field control so that a magnetic flux in such a direction that weakens the field flux of the electric motor 4 is generated from an armature coil.

A mode control portion 5 selects a control mode to be executed from a plurality of control modes, based on the operating state of the electric motor 4 including the rotating speed ω and the target torque TM, and controls the operating state of each part of the control device 2 according to the selected control mode. As shown in FIG. 2, the rotating speed ω, the target torque TM, the modulation ratio M, and the d-axis current adjustment command value ΔId are input to the mode control portion 5, and the control operation of the mode control portion 5 is performed based on these input values. Although the mode control portion 5 basically selects a control mode based on the input target torque TM and the input rotating speed ω, a given limitation can be placed on the control mode selection operation, based on the d-axis current adjustment command value ΔId.

In the present embodiment, regarding voltage waveform control that is performed by controlling the inverter 6 based on the voltage command values Vd, Vq, the control device 2 is structured to be able to perform the PWM control and the rectangular wave control. Regarding the field control for controlling the field flux of the electric motor 4, the control device 2 is also structured to be able to perform the normal field control in which the basic d-axis current command value Idb determined based on the target torque TM is not adjusted, and the field weakening control in which the d-axis current command value Idb is adjusted so as to weaken the field flux of the electric motor 4. The mode control portion 5 selects one of the plurality of control modes by combining the voltage waveform control and the field control. For example, the mode control portion 5 may be structured as follows. If the modulation ratio M is 0.78 or more, the mode control portion 5 selects a control mode in which the rectangular wave control is performed together with the field weakening control. If the modulation ratio M is less than 0.78, the mode control portion 5 selects a control mode in which the PWM control is performed together with the normal field control (the maximum torque control). Note that since the PWM control and the rectangular wave control are known in the art, detailed description thereof will be omitted. The PWM control and the rectangular wave control will be described only briefly below.

In the PWM control, the switching devices E1 to E6 of the inverter 6 are turned on/off based on AC voltage waveforms (AC voltage command values Vu, Vv, Vw described below) based on the voltage command values Vd, Vq. More specifically, each of U, V, and W-phase output voltage waveforms (PWM waveforms) of the inverter 6 is formed by a set of pulses, which is formed by high level periods during which the upper arm elements E1, E3, E5 are ON, and low level periods during which the lower arm elements E2, E4, E6 are ON, and the duty ratio of the pulses is controlled so that a fundamental wave component thereof is shaped like a substantially sinusoidal wave in a certain period of time. In the PWM control, the modulation ratio M can be varied in the range of "0 to 0.78." Such PWM control includes space vector PWM (SVPWM) control, sinusoidal wave PWM control, overmodulation PWM control, and the like. Note that in the PWM control, the switching control signals S1 to S6 (PWM signals) for controlling switching of the switching elements E1 to E6 are generated based on comparison between the AC voltage command values Vu, Vv, Vw and a carrier (a carrier wave). In the SVPWM control, a PWM waveform is directly generated by performing a digital operation rather than based on comparison with the carrier. However, in this case as well, it can be said that the switching control signals S1 to S6 (the PWM signals) are generated based on a virtual carrier.

In the rectangular wave control, the switching elements E1 to E6 are turned on/off once in every cycle of the electrical angle of the electric motor 4. That is, each of the U, V, and W-phase output voltage waveforms of the inverter 6 is controlled so as to have a rectangular wave in which one high level period and one low level period alternately appear in each cycle, and the ratio of the high level period to the low level period is 1:1. In this case, the U, V, and W-phase output voltage waveforms are output with a phase difference of 120° from each other. In the rectangular wave control, the modulation ratio M is fixed to the maximum value "0.78."

The voltage control portion 10 performs the voltage control process of generating the switching control signals S1 to S6 of the inverter 6 corresponding to the voltage command values Vd, Vq. In this example, the voltage control portion 10 selectively performs the PWM control and the rectangular wave control based on the control mode selection of the mode control portion 5. Note that the voltage control period Pv is input from the control period setting portion 14 described below to the voltage control portion 10 (in this example, both a two-phase/three-phase converting portion 25 and a control signal generating portion 26). The voltage control portion 10 performs the voltage control process in every voltage control period Pv.

In the present embodiment, as shown in FIG. 2, the voltage control portion 10 includes the two-phase/three-phase converting portion 25 and the control signal generating portion 26. The d-axis voltage command value Vd and the q-axis voltage command value Vq are input to the two-phase/three-phase converting portion 25. The magnetic pole position θ detected by the rotation sensor 43 (see FIG. 1), and the voltage control period Pv are also input to the two-phase/three-phase converting portion 25. The two-phase/three-phase converting portion 25 performs two-phase/three-phase conversion of the d-axis voltage command value Vd and the q-axis voltage command value Vq by using the magnetic pole position θ, thereby deriving three-phase AC voltage command values, namely the U-phase voltage command value Vu, the V-phase voltage command value Vv, and the W-phase voltage command value Vw. In this example, this process is performed in every voltage control period Pv. However, since the waveforms of these AC voltage command values Vu, Vv, Vw vary depending on the control mode, the two-phase/three-phase converting portion 25 outputs the AC voltage command values Vu, Vv, Vw, each having a different voltage waveform depending on the control mode, to the control signal generating portion 26.

More specifically, if a command to perform the PWM control is applied from the mode control portion 5, the two-phase/three-phase converting portion 25 outputs the AC voltage command values Vu, Vv, Vw, each having an AC voltage waveform according to the PWM control. If a command to perform the rectangular wave control is applied from the mode control portion 5, the two-phase/three-phase converting portion 25 outputs the AC voltage command values Vu, Vv, Vw, each having an AC voltage waveform according to the rectangular wave control. When performing the rectangular wave control, the AC voltage command values Vu, Vv, Vw can be output as command values of the phase for switching on/off the switching elements E1 to E6 of the inverter 6. These command values are command values that correspond to on/off control signals of the switching elements E1 to E6, and represent the phase of the magnetic pole position θ indicating the timing of switching on or off the switching elements E1 to E6.

The U-phase voltage command value Vu, the V-phase voltage command value Vv, and the W-phase voltage command value Vw generated by the two-phase/three-phase converting portion 25 are input to the control signal generating portion 26. The voltage control period Pv is also input to the control signal generating portion 26. The control signal generating portion 26 generates the switching control signals S1 to S6 for controlling the switching elements E1 to E6 of the inverter 6 of FIG. 1, according to these AC voltage command values Vu, Vw, Vw. In this example, this process is performed in every voltage control period Pv. The inverter 6 turns on/off the switching elements E1 to E6 according to the switching control signals S1 to S6. The PWM control or the rectangular wave control of the electric motor 4 is performed in this manner.

3. Structure of Functional Portions Relating to Setting of Control Periods

The structure of each functional portion relating to setting of control periods, which is a main part of the present invention, will be described below. As shown in FIG. 2, the control device 2 of the present embodiment includes a current control period determining portion 12, a voltage control period determining portion 13, the control period setting portion 14, and a control period storing portion 15 as such functional portions.

The current control period determining portion 12 determines the current control period Pi, which is a period of performing the current control process, based on the input target torque TM of the electric motor 4. The current control period Pi is determined repeatedly at predetermined current control timings, whereby the current control period Pi according to the target torque TM at the current control timing is determined. The current control period Pi determined by the current control period determining portion 12 is output to the control period setting portion 14.

In the present embodiment, as shown in FIG. 3, the current control period determining portion 12 refers to a current control period map stored in the control period storing portion 15, and determines the current control period Pi, which is allocated to a target torque range of the target torque TM at the current control timing, as the period of performing the current control process. Note that in the current control period map, the current control period Pi is defined so as to increase stepwise as the target torque TM decreases. Thus, by merely referring to the current control period map, the current control period determining portion 12 can determine the current control period Pi according to the target torque TM so that the current control period Pi increases stepwise as the target torque TM decreases. This enables the current control period Pi to be set appropriately according to response characteristics of the electric motor 4 which degrade as the target torque TM decreases. This also reduces the possibility that the voltage command values may be updated (the current control process may be performed) with such a short period that the electric motor 4 cannot follow appropriately. Note that the current control period map will be described in detail later.

The voltage control period determining portion 13 determines the voltage control period Pv, which is a period of performing the voltage control process, based on the input rotating speed ω of the electric motor 4. The voltage control period Pv is determined repeatedly at predetermined voltage control timings, whereby the voltage control period Pv according to the rotating speed ω at the voltage control timing is determined. The voltage control period Pv determined by the voltage control period determining portion 13 is output to the control period setting portion 14.

In the present embodiment, as shown in FIG. 3, the voltage control period determining portion 13 refers to a voltage control period map stored in the control period storing portion 15, and determines the voltage control period Pv, which is allocated to a rotating speed range of the rotating speed ω at the voltage control timing, as the period of performing the voltage control process. Note that in the voltage control period map, the voltage control period Pv is defined so as to increase stepwise as the rotating speed ω decreases. Thus, by merely referring to the voltage control period map, the voltage control period determining portion 13 can determine the voltage control period Pv according to the rotating speed o so that the voltage control period Pv increases stepwise as the rotating speed ω decreases. This enables the voltage control period Pv to be set appropriately according to a change with time of the magnetic pole position that indicates the rotation angle of the rotor (not shown) of the electric motor 4, which occurs at a lower rate as the rotating speed ω decreases. This can reduce the possibility that the switching control signals S1 to S6 may be generated (the voltage control process may be performed) with an unnecessarily short period in order to reduce the magnitude of current ripples to a practically acceptable level. Note that the voltage control period map will be described in detail later.

The control period setting portion 14 sets the current control period Pi and the voltage control period Pv based on the determination of the current control period determining portion 12 and the voltage control period determining portion 13. In this example, the operation of determining the current control period Pi by the current control period determining portion 12 and the operation of determining the voltage control period Pv by the voltage control period determining portion 13 are performed repeatedly at predetermined timings as described above. Basically, the control period setting portion 14 sets the period of performing the current control process by outputting to the current control portion 24 the same value as the current control period Pi determined by the current control period determining portion 12. The control period setting portion 14 also sets the period of performing the voltage control process by outputting to the voltage control portion 10 the same value as the voltage control period Pv determined by the voltage control period determining portion 13. Since the control period setting portion 14 is structured to set the current control period Pi and the voltage control period Pv in this manner, the current control period Pi and the voltage control period Pv can be set according to the operating point of the electric motor 4, while reducing the possibility that the current control process and the voltage control process may be performed with an unnecessarily short period. This reduces the possibility that an operation load on an arithmetic processing unit included in the control device 2 may increase unnecessarily. The operation load relating to the current feedback control of the arithmetic processing unit of the control device 2 is reduced as the current control period Pi and the voltage control period Pv increase. This structure enables the arithmetic processing unit to easily perform other process in parallel, or the like.

Note that in the present embodiment, the control period setting portion 14 is structured so as to set the voltage control period Pv for the voltage control portion 10 to the same value as the current control period Pi determined by the current control period determining portion 12, if the current control period Pi determined by the current control period determining portion 12 is shorter than the voltage control period Pv determined by the voltage control period determining portion 13. The structure as in this example, namely the structure in which the voltage control process that is performed by the voltage control portion 10 generates the switching control signals S1 to S6 of the inverter 6 based on the voltage command values Vd, Vq determined by the most resent current control process, can reduce the possibility that part of the update result of the voltage command values Vd, Vq by the current control process may not be reflected on the voltage control process, and the voltage command values Vd, Vq may be updated unnecessarily frequently.

The control period storing portion 15 stores the current control period map and the voltage control period map. The current control period map defines the current control period Pi for each of a plurality of target torque regions that are set by dividing a possible range of the target torque TM into a plurality of regions. The voltage control period map defines the voltage control period Pv for each of a plurality of rotating speed regions that are set by dividing a possible range of the rotating speed ω into a plurality of regions.

FIG. 3 conceptually shows the current control period map and the voltage control period map on a graph where the abscissa indicates the rotating speed ω and the ordinate indicates the target torque TM. Note that in FIG. 3, the boundary of a region where the electric motor 4 is operable is shown by sold line, and in this example, ω3 represents a maximum possible value of the rotating speed ω, and TM3 represents a maximum possible value of the target torque TM. In the example of FIG. 3, a basic operation period as a reference period is set to "100 μs," and the current control period Pi and the voltage control period Pv are set to integer multiples of the basic operation period. Note that the basic operation period can be determined according to the period of the carrier for generating the switching control signals S1 to S6 in the PWM control. For example, the basic operation period may be a half of the period of the carrier. Note that FIG. 3 shows the current control period map and the voltage control period map in combination in order to illustrate these maps stored in the control period storing portion 15. However, the current control period map and the voltage control period map may be combined to be stored as a two-dimensional map in the control period storing portion 15, or the current control period map and the voltage control period map may be stored in the control period storing portion 15 as maps that are independent of each other.

As shown in FIG. 3, in the present embodiment, the current control period map defines the current control period Pi for each of three target torque regions that are set by dividing a possible range of the target torque TM into three regions that do not overlap each other. More specifically, the following three target torque regions are set in the current control period map: a region where the target torque TM is TM1 or less (hereinafter referred to as the "first target torque region A1"); a region where the target torque TM is larger than TM1 and is TM2 or less (hereinafter referred to as the "second target torque region A2"); and a region where the target torque TM is larger than TM2 and is TM3 or less (hereinafter referred to as the "third target torque region A3"). The current control period Pi of "800 μs" is allocated to the first target torque region A1, the current control period Pi of "400 μs" is allocated to the second target torque region A2, and the current control period Pi of "200 μs" is allocated to the third target torque region A3. Thus, the current control period map defines the current control period Pi that increases stepwise as the target torque region decreases.

On the other hand, as shown in FIG. 3, in the present embodiment, the voltage control period map defines the voltage control period Pv for each of three rotating speed regions that are set by dividing a possible range of the rotating speed ω into three regions that do not overlap each other. More specifically, the following three rotating speed regions are set in the voltage control period map: a region where the rotating speed ω is ω1 or less (hereinafter referred to as the "first rotating speed region B1"); a region where the rotating speed ω is larger than col and is ω2 or less (hereinafter referred to as the "second rotating speed region B2"); and a region where the rotating speed ω is larger than ω2 and is ω3 or less (hereinafter referred to as the "third rotating speed region B3"), The voltage control period Pv of "400 μs" is allocated to the first rotating speed region B1, the voltage control period Pv of "200 μs" is allocated to the second rotating speed region B2, and the voltage control period Pv of "100 μs" is allocated to the third rotating speed region B3. Thus, the voltage control period map defines the voltage control period Pv that increases stepwise as the rotating speed region decreases.

As described above, the control period setting portion 14 is structured to set the voltage control period Pv to the same value as the current control period Pi determined by the current control period determining portion 12, when the current control period Pi determined by the current control period determining portion 12 is shorter than the voltage control period Pv determined by the voltage control period determining portion 13. In the example of FIG. 3, the voltage control period Pv is set in this manner when the target torque TM of the electric motor 4 is in the third target torque region A3, and the rotating speed ω is in the first rotating speed region B1. More specifically, in this case, the voltage control period determining portion 13 determines "400 μs" as the voltage control period Pv. However, the current control period Pi determined by the current control period determining portion 12 is "200 μs," which is smaller than "400 μs." Thus, the control period setting portion 14 sets the voltage control period Pv to "200 μs" instead of "400 μs,"

Providing such a control period storing portion 15 enables the current control period determining portion 12 and the voltage control period determining portion 13 to appropriately determine the current control period Pi and the voltage control period Pv by merely referring to the current control period map and the voltage control period map stored in the control period storing portion 15. This can simplify the structure of the current control period determining portion 12 and the voltage control period determining portion 13, and also reduces the possibility that the operation load on the arithmetic processing unit of the control device 2 may increase significantly upon determination of the current control period Pi and the voltage control period Pv.

The value of the current control period Pi defined by the current control period map is set based on an electrical time constant T of the electric motor 4 that is determined according to the target torque TM. This will be described in detail below. The minimum period of updating the voltage command values Vd, Vq that the electric motor 4 can appropriately follow (hereinafter referred to as the "minimum current control period") increases as the target torque TM (the current command values Id, Iq) decreases, and this minimum current control period can be appropriately derived based on the electrical time constant T. The electrical time constant T of the electric motor 4 is given by T=(L/R) by an armature winding resistance R and inductance L. The minimum current control period can be derived by multiplying the electrical time constant T by, e.g., a predetermined coefficient. Note that, for example, a coefficient based on the maximum possible value of a change ratio of the target torque TM can be used as the predetermined coefficient.

By considering the electrical time constant T, the minimum current control period or a period that is not significantly longer than the minimum current control period can be set as the current control period Pi, whereby an appropriate period that is not unnecessarily short can be set as the current control period Pi according to the target torque TM, while reducing the possibility that control response characteristics may degrade due to the control device 2.

Figure 4:
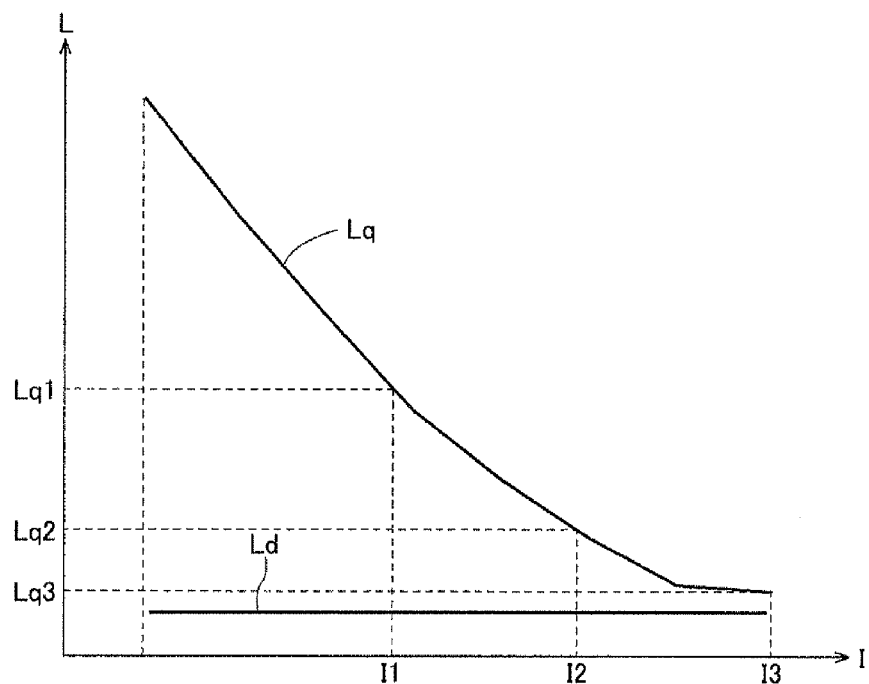
FIG. 4 is a graph showing an example of the relation between d-axis inductance and q-axis inductance, and a current.

FIG. 4 is a graph showing an example of the relation between the d-axis inductance Ld and the q-axis inductance Lq, and a current in the electric motor 4 of the present embodiment. Note that in FIG. 4, the abscissa indicates a d-axis current for the d-axis inductance Ld, and indicates a q-axis current for the q-axis inductance Lq. Note that although the d-axis current and the q-axis current are simply referred to as a current I in the following description, the current I indicates the d-axis current when referring to a physical quantity relating to the d-axis such as the d-axis inductance Ld, and indicates the q-axis current when referring to a physical quantity relating to the q-axis such as the q-axis inductance Lq.

In the example of FIG. 4, the q-axis inductance Ld changes more than the d-axis inductance Ld does with respect to the current I. The q-axis inductance Lq is larger than the d-axis inductance Ld in the entire region of the current value in FIG.

4. Thus, a q-axis electrical time constant Tq (=Lq/R) is larger than a d-axis electrical time constant Td (=Ld/R) in the entire region of the current value in FIG. 4. Accordingly, response is lower in the q-axis than in the d-axis, and in this example, the relation of the current control period Pi among different target torque regions as defined in the current control period map is set based on the electrical time constant Tq of the q-axis having lower response, as described below.

As shown in FIG. 4, Lq1 represents the q-axis inductance Lq when the current I is I1, Lq2 represents the q-axis inductance Lq when the current I is I2, and Lq3 represents the q-axis inductance Lq when the current I is I3. Note that the current I1 is a current corresponding to a value of the target torque TM (TM1) that defines the upper limit in the first target torque region A1, the current I2 is a current corresponding to a value of the target torque TM (TM2) that defines the upper limit in the second target torque region A2, and the current I3 is a current corresponding to a value of the target torque TM (TM3) that defines the upper limit in the third target torque region A3. As shown in FIG. 4, Lq1 is four times Lq3, and Lq2 is twice Lq3.

If a change in the armature winding resistance R with respect to the current I can be ignored, the q-axis electrical time constant Tq (=Lq1/R) when the current I is I1 is four times the q-axis electrical time constant Tq (=Lq3/R) when the current I is I3, and the q-axis electrical time constant Tq (=Lq2/R) when the current I is I2 is twice the q-axis electrical time constant Tq (=Lq3/R) when the current I is I3. As shown in FIG. 3, the relation of the current control period Pi among different target torque regions as defined in the current control period map is set in view of this relation with respect to the q-axis electrical time constant Tq. That is, the current control period Pi is set so that the current control period Pi that is allocated to the first target torque region A1 whose upper limit is defined by the target torque TM1 corresponding to the current I1, and the current control period Pi that is allocated to the second target torque region A2 whose upper limit is defined by the target torque TM2 corresponding to the current I2, are respectively four times (in this example, "800 μs") and twice (in this example, "400 μs") the current control period Pi (in this example, "200 μs") that is allocated to the third target torque region A3 whose upper limit is defined by the target torque TM3 corresponding to the current I3.

On the other hand, the value of the voltage control period Pv defined by the voltage control period map is set based on the time corresponding to one cycle of the electrical angle that is determined according to the rotating speed ω (hereinafter simply referred to as the "electrical-angle cycle time"). This will be described in detail below. The maximum period of updating the switching control signals S1 to S6 in which the magnitude of current ripples is suppressed to a practically acceptable level (hereinafter referred to as the "maximum voltage control period") increases as the rotating speed ω decreases, and this maximum voltage control period can be appropriately derived based on the electrical-angle cycle time. The electrical-angle cycle time can be derived based on the rotating speed ω and the number of magnetic poles, and increases as the rotating speed ω decreases. More specifically, the electrical-angle cycle time is proportional to the reciprocal of the rotating speed ω. The maximum voltage control period can be derived by dividing the electrical-angle cycle time by a predetermined constant. Note that the predetermined constant may be, e.g., "10."

By considering the electrical-angle cycle time, the maximum voltage control period described above or a period that is not significantly shorter than the maximum current control period can be set as the voltage control period Pv, whereby an appropriate period that is not unnecessarily short can be set as the voltage control period Pv according to the rotating speed ω, while reducing the possibility that the current ripples may increase.

In the example of FIG. 3, the rotating speed ω1 and the rotating speed ω2 are "¼" and "½" of the rotating speed ω3, respectively. That is, the electrical-angle cycle time corresponding to the rotating speed ω1, and the electrical-angle cycle time corresponding to the rotating speed ω2 are four times and twice the electrical-angle cycle time corresponding to the rotating speed ω3. As shown in FIG. 3, the relation of the voltage control period Pv among different rotating speed regions as defined in the voltage control period map is set in view of this relation with respect to the electrical-angle cycle time. That is, the voltage control period Pv is set so that the voltage control period Pv that is allocated to the first rotating speed region B1 whose upper limit is defined by the rotating speed ω1, and the voltage control period Pv that is allocated to the second rotating speed region B2 whose upper limit is defined by the rotating speed ω2 are respectively four times (in this example, "400 μs") and twice (in this example, "200 μs") the voltage control period Pv (in this example, "100 μs") that is allocated to the third rotating speed region B3 whose upper limit is defined by the rotating speed ω3.

As described above, the current control portion 24 performs a current feedback control process of determining the voltage command values Vd, Vq by performing proportional control and integral control based on the deviation between the current command value Id, Iq and the current detection value Idr, Iqr. In the present embodiment, the d-axis proportional control gain Kpd, the q-axis proportional control gain Kpd, the d-axis integral control gain Kid, and the q-axis integral control gain Kiq used in the current feedback control process are given by the following expressions by the d-axis inductance Ld, the q-axis inductance Lq, and the armature winding resistance R.

$$Kpd = \omega c \times Ld \tag{10}$$

$$Kpq = \omega c \times Lq \tag{11}$$

$$Kid = Kiq = \omega c \times R \tag{12}$$

In the above expressions, ωc represents a cutoff angular frequency, which is the reciprocal of a target response time constant. Note that the cutoff angular frequency ωc can be basically determined arbitrarily, although there is an upper limit according to the current control period Pi.

In the present embodiment, the d-axis proportional control gain Kpd, the q-axis proportional control gain Kpq, the d-axis integral control gain Kid, and the q-axis integral control gain Kiq are changed according to the current control period Pi. That is, both the proportional control gains Kpd, Kpq and the integral control gains Kid, Kiq are changed according to the current control period Pi. This enables the proportional control gains Kpd, Kpq and the integral control gains Kid, Kiq to be appropriately set while reducing the possibility of an overshoot phenomenon and a decrease in capability of the current detection values Idr, Iqr to follow the current command values Id, Iq, when the current control period Pd is changed.

More specifically, in the present embodiment, both the proportional control gains Kpd, Kpq and the integral control gains Kid, Kiq are changed according to the current control period Pi by changing the cutoff angular frequency ωc according to the current control period Pi. For example, the cutoff angular frequency ωc is changed at the same rate as that of the current control period Pi. That is, if the current control period Pi is multiplied by N (where N is a positive value), the cutoff angular frequency ωc can also be multiplied by N.

As described above, in the PWM control, the switching control signals S1 to S6 of the inverter 6 are PWM signals that are generated based on the carrier. If the control device 2 is structured so as to be able to switch the frequency of the carrier (the carrier frequency), switching losses can be reduced by structuring the control device 2 so as to reduce the carrier frequency according to an increase in the voltage control period Pv. For example, the control device 2 can be structured so that the carrier frequency and the voltage control period Pv can be simultaneously switched while maintaining a given relation between the cycle of the carrier and the voltage control period Pv (e.g., the cycle of the carrier is the same as or twice the voltage control period Pv).

As described above, according to the present invention, the current control period Pi and the voltage control period Pv can be set according to the operating point of the electric motor 4, while reducing the possibility that the current control process and the voltage control process may be performed with an unnecessarily short period. This can reduce the possibility that the operation load on the arithmetic processing unit of the control device 2 may increase unnecessarily. Moreover, the operation load associated with the current feedback control of the arithmetic processing unit of the control device 2 is reduced as the current control period Pi and the voltage control period Pv increase. This structure enables the arithmetic processing unit to easily perform other process in parallel, or the like.

4. Other Embodiments (1) The above embodiment is described with respect to an example in which three target torque regions are set by dividing the possible range of the target torque TM into three regions that do not overlap each other, as shown in FIG. 3. However, embodiments of the present invention are not limited to this, and it is also one of preferred embodiments of the present invention to set any number of (e.g., two, four, or the like) target torque regions other than three, based on the possible range of the target torque TM. It is also preferable to set a plurality of target torque regions by dividing the possible range of the target torque TM into a plurality of regions that overlap each other. In this structure, if the target torque TM at the time the current control period determining portion 12 determines the current control period Pi is in an overlap portion of adjacent target torque regions, to which target torque region this target torque TM belongs can be determined based also on an index other than the target torque TM (the rotating speed ω, the modulation ratio M, whether the electric motor 4 is functioning as an electric motor or an electric generator, or the like).

(2) The above embodiment is described with respect to an example in which three rotating speed regions are set by dividing the possible range of the rotating speed ω into three regions that do not overlap each other, as shown in FIG. 3. However, embodiments of the present invention are not limited to this, and it is also one of preferred embodiments of the present invention to set any number of (e.g., two, four, or the like) rotating speed regions other than three based on the possible range of the rotating speed ω. It is also preferable to set a plurality of rotating speed regions by dividing the possible range of the rotating speed ω into a plurality of regions that overlap each other. In this structure, if the rotating speed ω at the time the voltage control period determining portion 13 determines the voltage control period Pv is in an overlap portion of adjacent rotating speed regions, to which rotating speed region this rotating speed ω belongs can be determined based also on an index other than the rotating speed ω (the target torque TM, the modulation ratio M, whether the electric motor 4 is functioning as an electric motor or an electric generator, or the like).

(3) The above embodiment is described with respect to an example in which the current control period determining portion 12 determines the current control period Pi by referring to the current control period map stored in the control period storing portion 15, and the voltage control period determining portion 13 determines the voltage control period Pv by referring to the voltage control period map stored in the control period storing portion 15. However, embodiments of the present invention are not limited to this. For example, it is also preferable that the current control period determining portion 12 determine the current control period Pi based on a predetermined expression according to the target torque TM. In any case, unlike the above embodiment in which the current control period Pi is determined as a value that increases stepwise as the target torque TM decreases, it is also preferable to determine the current control period Pi as a value that continuously increases as the target torque TM decreases. It is also preferable that the voltage control period determining portion 13 determine the voltage control period Pv based on a predetermined expression according to the rotating speed ω. In any case, unlike the above embodiment in which the voltage control period Pv is determined as a value that increases stepwise as the rotating speed ω decreases, it is also preferable to determine the voltage control period Pv as a value that continuously increases as the rotating speed ω decreases.

(4) The above embodiment is described with respect to an example in which, if the current control period Pi determined by the current control period determining portion 12 is shorter than the voltage control period Pv determined by the voltage control period determining portion 13, the control period setting portion 14 sets the voltage current period Pv to the same value as the current control period Pi determined by the current control period determining portion 12. However, embodiments of the present invention are not limited to this. It is also preferable that the control period setting portion 14 set the voltage current period Pv to the value determined by the voltage control period determining portion 13, even if the current control period Pi determined by the current control period determining portion 12 is shorter than the voltage control period Pv determined by the voltage control period determining portion 13. In such a structure, it is preferable to generate the switching control signals S1 to S6 of the inverter 6 based not only on the voltage command values Vd, Vq determined by the most recent current control process, but also on the voltage command values Vd, Vq determined by an earlier current control process, in the voltage control process of the voltage control portion 10.

(5) The above embodiment is described with respect to an example in which the d-axis voltage adjustment value ΔVd and the q-axis voltage adjustment value ΔVq are given by the expressions (6) and (7). However, embodiments of the present invention are not limited to this. For example, it is also one of preferred embodiments of the present invention that the d-axis voltage adjustment value ΔVd and the q-axis voltage adjustment value ΔVq are given by the expressions (13) and (14) below.

$$\Delta Vd = Vzd - Eq \quad (13)$$

$$\Delta Vq = Vzq + Ed + Em \quad (14)$$

Vzd represents a d-axis voltage drop, and is given by the product of the armature winding resistance R and the actual d-axis current Idr. Vzq represents a q-axis voltage drop, and is given by the product of the armature winding resistance R and the actual q-axis current Iqr. It is also preferable to use the d-axis current command value Id and the q-axis current command value Iq instead of the actual d-axis current Idr and the actual q-axis current Iqr to derive the d-axis voltage adjustment value $\Delta Vd$ and the q-axis voltage adjustment value $\Delta Vq$ based on the expressions (6) and (7), or the expressions (13) and (14). It is also preferable to set the d-axis voltage adjustment value $\Delta Vd$ and the q-axis voltage adjustment value $\Delta Vq$ to zero, that is, to use the basic d-axis voltage command value Vdb and the basic q-axis voltage command value Vqb as they are as the d-axis voltage command value Vd and the q-axis voltage command value Vq.

(6) The above embodiment is described with respect to an example in which the current control period determining portion 12 refers to the current control period map to determine the current control period Pi, which is allocated to the target torque region to which the target torque TM at the time of determining the current control period Pi belongs, as a period of performing the current control process. Moreover, the above embodiment is described with respect to an example in which the voltage control period determining portion 13 refers to the voltage control period map to determine the voltage control period Pv, which is allocated to the rotating speed region to which the rotating speed $\omega$ at the time of determining the voltage control period Pv belongs, as a period of performing the voltage control process. However, embodiments of the present invention are not limited to this. For example, it is also one of preferred embodiments of the present invention to provide hysteresis at the boundary between adjacent target torque regions to set a boundary value in the case where the target torque TM is increasing to a value larger than a boundary value in the case where the target torque TM is decreasing. It is also one of preferred embodiments of the present invention to provide hysteresis at the boundary between adjacent rotating speed regions to set a boundary value in the case where the rotating speed $\omega$ is increasing, to a value larger than a boundary value in the case where the rotating speed $\omega$ is decreasing.

(7) The above embodiment is described with respect to an example in which the current control period Pi that is determined by the current control period determining portion 12 is a value that is set based on the electrical time constant T of the electric motor 4 that is determined according to the target torque TM, and the voltage control period Pv that is determined by the voltage control period determining portion 13 is a value that is set based on the time corresponding to one cycle of the electrical angle that is determined according to the rotating speed $\omega$. However, embodiments of the present invention are not limited to this. For example, it is also preferable that the current control period Pi have a value that is set based on other index (e.g., the reciprocal of the target torque TM, or the like) rather than based on the electrical time constant T. It is also preferable that the voltage control period Pv have a value that is set based on other index (e.g., the reciprocal of the rotating speed $\omega$, or the like) rather than based on the time corresponding to one cycle of the electrical angle.

(8) The above embodiment is described with respect to an example in which TM1, TM2, and TM3, which define the boundaries of the target torque regions, are determined based on characteristics of the q-axis inductance Lq shown in FIG. 4. However, embodiments of the present invention are not limited to this, and the values of the target torque TM, which define the boundaries of the target torque regions, can be set arbitrarily and independently of each other. For example, it is preferable to set the values of the target torque TM, which define the boundaries of the target torque regions, so that the possible range of the target torque TM is substantially equally divided. The above embodiment is described with respect to an example in which $\omega 1$, $\omega 2$, and $\omega 3$, which define the boundaries of the target torque regions, are determined so that $\omega 1$ and $\omega 2$ are "¼" and "½" of $\omega 3$, respectively. However, embodiments of the present invention are not limited to this, and the values of the rotating speed $\omega$, which define the boundaries of the rotating speed regions, can be set arbitrarily and independently of each other. For example, it is preferable to set the values of the rotating speed $\omega$, which define the boundaries of the rotating speed regions, so that the possible range of the rotating speed $\omega$ is substantially equally divided.

(9) The above embodiment is described with respect to an example in which the d-axis proportional control gain Kpd, the q-axis proportional control gain Kpq, the d-axis integral control gain Kid, and the q-axis integral control gain Kiq are given by the expressions (10) to (12), and both the proportional control gains Kpd, Kpq and the integral control gains Kid, Kiq are changed according to the current control period Pi by changing the cutoff angular frequency $\omega c$ according to the current control period Pi. However, embodiments of the present invention are not limited to this, and it is also one of preferred embodiments of the present invention that the cutoff angular frequency we be not changed according to the current control period Pi, and the gains be changed only with a change in inductance Ld, Lq and a change in armature winding resistance R.

(10) The above embodiment is described with respect to an example in which the d-axis proportional control gain Kpd, the q-axis proportional control gain Kpq, the d-axis integral control gain Kid, and the q-axis integral control gain Kiq are given by the expressions (10) to (12). However, embodiments of the present invention are not limited to this, and it is also one of preferred embodiments of the present invention that these gains be set independently of each other without using a common physical quantity (in the above embodiment, the cutoff angular frequency $\omega c$). In this case, it is also preferable to change only a part of the gains according to the current control period Pi, and not to change the remainder of the gains according to the current control period Pi. For example, it is possible to change one of the proportional control gains Kpd, Kpq and the integral control gains Kid, Kiq according to the current control period Pi, and not to change the other gains according to the current control period Pi. As used herein, the expression "not to change the gain according to the current control period Pi" does not necessarily mean that the gain has a fixed value, but indicates a concept including the structure in which the gain is changed based on an index other than the current control period Pi.

(11) The above embodiment is described with respect to an example in which the AC electric motor (the electric motor 4) is an interior permanent magnet synchronous electric motor (IPMSM) that is operated by a three-phase alternating current. However, embodiments of the present invention are not limited to this. For example, a surface permanent magnet synchronous electric motor (SPMSM) may be used as the electric motor 4. In addition to the synchronous electric motors, an induction electric motor or the like, for example, may be used as the electric motor 4. A single-phase alternating current, or a multiphase alternating current other than the three-phase alternating current, such as a two-phase, four-phase or higher alternating current, may be used as an alternating current that is supplied to such an AC electric motor.

(12) The above embodiment is described with respect to an example in which the current control period Pi is determined by the current control period determining portion 12 according to the target torque TM, the voltage control period Pv is determined by the voltage control period determining portion 13 according to the rotating speed ω, and the current control period Pi and the voltage control period Pv are set to integer multiples of the basic operation period. In this case, the current control process of the current control portion 24 and the voltage control process of the voltage control portion 10 can occur simultaneously. If the current control process and the voltage control process occur simultaneously, it is preferable to perform the voltage control process prior to the current control process. By thus giving priority to the voltage control process over the current control process, the current control period Pi is not limited to integer multiples of the basic operation period, and can also be determined so as to be equal to or larger than the voltage control period Pv.

(13) The above embodiment is described with respect to an example in which the U-phase current Iur, the V-phase current Ivr, and the W-phase current Iwr are detected by the current sensor 42, and the magnet pole position θ is detected by the rotation sensor 43. In this case, it is preferable to detect the three-phase currents Iur, Ivr, Iwr and the magnet pole position θ in synchronization with the voltage control period Pv once or a plurality of times in the voltage control period Pv, and it is also preferable to detect the three-phase currents Iur, Ivr, Iwr and the magnet pole position θ in synchronization with the current control period Pi once or a plurality of times in the current control period Pi. It is also preferable to perform detection of the three-phase currents Iur, Ivr, Ivr and the magnet pole position θ without being in synchronization with either of the current control period Pi and the voltage control period Pv, but to detect the three-phase currents Iur, Ivr, Iwr and the magnet pole position θ in synchronization with a predetermined rotation period (such as, e.g., an electrical angle of 360°) once or a plurality of times in the predetermined rotation period.

(14) The above embodiment is described with respect to an example in which the target torque TM is input to the current control period determining portion 12, and the current control period determining portion 12 determines the current control period Pi based on the input target torque TM and by referring to the control period storing portion 15. Moreover, the above embodiment is described with respect to an example in which the rotating speed ω is input to the voltage control period determining portion 13, and the voltage control period determining portion 13 determines the voltage control period Pv based on the input rotating speed ω and by referring to the control period storing portion 15. However, embodiments of the present invention are not limited to this. For example, it is also one of preferred embodiments of the present invention that the target torque TM and the rotating speed ω be input to the control period storing portion 15, and the control period storing portion 15 output the current control period Pi and the voltage control period Pv according to the target torque TM and the rotating speed ω to the current control period determining portion 12 and the voltage control period determining portion 13. In this case, it is also possible not to input the target torque TM to the current control period determining portion 12. It is also possible not to input the rotating speed ω to the voltage control period determining portion 13.

The present invention is preferably used for control devices for controlling an electric motor drive device that includes an inverter that converts a DC voltage to an AC voltage to supply the AC voltage to an AC electric motor.

What is claimed is:

1. A control device for controlling an electric motor drive device including an inverter that converts a DC voltage to an AC voltage to supply the AC voltage to an AC electric motor, comprising:
    a current control portion for performing a current control process of determining a voltage command value based on a deviation between a current command value, which is a command value of a current to be applied to a coil of the AC electric motor, and a current detection value, which is a detection value of a current that flows in the coil;
    a voltage control portion for performing a voltage control process of generating a switching control signal of the inverter corresponding to the voltage command value;
    a current control period determining portion for determining a current control period, which is a period of performing the current control process, based on target torque of the AC electric motor;
    a voltage control period determining portion for determining a voltage control period, which is a period of performing the voltage control process, based on a rotating speed of the AC electric motor; and
    a control period setting portion for setting the current control period and the voltage control period based on the determination of the current control period determining portion and the voltage control period determining portion, wherein
    the current control period determining portion determines, according to the target torque, the current control period as a value that increases continuously or stepwise as the target torque decreases, and
    the voltage control period determining portion determines, according to the rotating speed, the voltage control period as a value that increases continuously or stepwise as the rotating speed decreases.

2. The control device according to claim 1, wherein
    the current control period that is determined by the current control period determining portion is a value that is set based on an electrical time constant of the AC electric motor that is determined according to the target torque, and
    the voltage control period that is determined by the voltage control period determining portion is a value that is set based on a time corresponding to one cycle of an electrical angle that is determined according to the rotating speed.

3. The control device according to claim 1, wherein
    if the current control period determined by the current control period determining portion is shorter than the voltage control period determined by the voltage control period determining portion, the control period setting portion sets the voltage control period to a same value as the current control period determined by the current control period determining portion.

4. The control device according to claim 3, further comprising:
    a control period storing portion that stores a current control period map, which defines the current control period for each of a plurality of target torque regions that are set by dividing a possible range of the target torque into a plurality of regions, and a voltage control period map, which defines the voltage control period for each of a plurality of rotating speed regions that are set by dividing a possible range of the rotating speed into a plurality of regions, wherein the current control period map defines the current control period that increases stepwise as the target torque region decreases, the voltage control period map defines the voltage control period that increases stepwise as the rotating speed region decreases, and the current control period determining portion determines the current control period by referring to the current control period map stored in the control period storing portion, and the voltage control period determining portion determines the voltage control period by referring to the voltage control period map stored in the control period storing portion.

5. The control device according to claim 4, wherein the current control process is a current feedback control process of determining the voltage command value by performing at least proportional control and integral control based on the deviation between the current command value and the current detection value, and both a proportional control gain, which is a control gain of the proportional control, and an integral control gain, which is a control gain of the integral control, are changed according to the current control period.

6. The control device according to claim 1, further comprising:

a control period storing portion that stores a current control period map, which defines the current control period for each of a plurality of target torque regions that are set by dividing a possible range of the target torque into a plurality of regions, and a voltage control period map, which defines the voltage control period for each of a plurality of rotating speed regions that are set by dividing a possible range of the rotating speed into a plurality of regions, wherein the current control period map defines the current control period that increases stepwise as the target torque region decreases, the voltage control period map defines the voltage control period that increases stepwise as the rotating speed region decreases, and the current control period determining portion determines the current control period by referring to the current control period map stored in the control period storing portion, and the voltage control period determining portion determines the voltage control period by referring to the voltage control period map stored in the control period storing portion.

7. The control device according to claim 1, wherein the current control process is a current feedback control process of determining the voltage command value by performing at least proportional control and integral control based on the deviation between the current command value and the current detection value, and both a proportional control gain, which is a control gain of the proportional control, and an integral control gain, which is a control gain of the integral control, are changed according to the current control period.

* * * * *